United States Patent
Li et al.

(10) Patent No.: US 12,494,855 B2
(45) Date of Patent: Dec. 9, 2025

(54) RECEIVER POWER-MANAGEMENT MECHANISM AND RELATED METHODS OF OPERATION

(71) Applicant: Nokia Technologies Oy, Espoo (FI)

(72) Inventors: Rui Li, San Diego, CA (US); Bo Wang, San Diego, CA (US); Wei Zhuo, San Diego, CA (US)

(73) Assignee: Nokia Technologies Oy, Espoo (FI)

( * ) Notice: Subject to any disclaimer, the term of this patent is extended or adjusted under 35 U.S.C. 154(b) by 392 days.

(21) Appl. No.: 17/994,931

(22) Filed: Nov. 28, 2022

(65) Prior Publication Data

US 2023/0087488 A1    Mar. 23, 2023

Related U.S. Application Data

(63) Continuation of application No. PCT/US2021/016179, filed on Feb. 2, 2021.

(60) Provisional application No. 63/032,971, filed on Jun. 1, 2020.

(51) Int. Cl.
*H04B 17/345* (2015.01)
*H04B 17/336* (2015.01)
*H04K 3/00* (2006.01)

(52) U.S. Cl.
CPC ......... *H04B 17/345* (2015.01); *H04B 17/336* (2015.01); *H04K 3/22* (2013.01)

(58) Field of Classification Search
CPC ...... H04B 17/345; H04B 17/336; H04K 3/22; Y02D 30/70; H04W 52/0245; H04W 52/0238
See application file for complete search history.

(56) References Cited

U.S. PATENT DOCUMENTS

| | | | |
|---|---|---|---|
| 2008/0192666 A1* | 8/2008 | Koskan | H04W 52/0261 455/574 |
| 2012/0071159 A1 | 3/2012 | Akhi et al. | |
| 2014/0015505 A1 | 1/2014 | George-Kelso et al. | |
| 2014/0086164 A1 | 3/2014 | Kim et al. | |
| 2015/0181519 A1* | 6/2015 | Klockar | H04W 52/243 455/501 |
| 2016/0065251 A1 | 3/2016 | Yoo et al. | |
| 2017/0265146 A1* | 9/2017 | Shiu | H04W 52/241 |
| 2017/0293027 A1 | 10/2017 | Stark et al. | |
| 2017/0346514 A1 | 11/2017 | Dimpflmaier et al. | |
| 2018/0260016 A1 | 9/2018 | Stevenson et al. | |

(Continued)

FOREIGN PATENT DOCUMENTS

CN    104604303 A    5/2015

OTHER PUBLICATIONS

International Search Report Mailed Apr. 14, 2021 in Application No. PCT/US2021/016179.

(Continued)

*Primary Examiner* — Ricky Q Ngo
*Assistant Examiner* — Kabir U Jahangir
(74) *Attorney, Agent, or Firm* — McCarter & English LLP (57) ABSTRACT

Circuits and methods for operating a receiver in a communication system is disclosed. The receiver analyzes interference power levels at two or more frequency regions within a received signal. The receiver selects a low-power circuit based on the frequency-analyzed interference power for processing the received signal.

18 Claims, 6 Drawing Sheets

(56) References Cited

U.S. PATENT DOCUMENTS

2019/0253277 A1  8/2019  Venkataraman et al.

OTHER PUBLICATIONS

Written Opinion Mailed Apr. 14, 2021 in Application No. PCT/US2021/016179.
First Office Action issued to Chinese Application No. 202180039767.3 dated Apr. 17, 2025 with English translation (17p).

* cited by examiner

RECEIVER POWER-MANAGEMENT MECHANISM AND RELATED METHODS OF OPERATION

CROSS-REFERENCE TO RELATED APPLICATION(S)

This application is based upon International Application No. PCT/US2021/016179, filed on Feb. 2, 2021, which is based upon and claims the benefit of U.S. Provisional Patent Application Ser. No. 63/032,971, filed Jun. 1, 2020, which is incorporated by reference herein in its entirety.

TECHNICAL FIELD

This application relates to the communications field, and more specifically, to a wireless communications method and device.

BACKGROUND

Rapid growth in computing technology is creating a greater demand for data communication. The increasing demand in turn drives further growth in communication technology, which often requires additional features, increased processing capacities, and/or increased resources within a given space. Such growth often introduces new challenges. For example, the increase in the processing speed and/or the amount of data communicated between devices (e.g., to/from a User Equipment (UE)) increases power consumption associated with the internal data processing, such as to accommodate faster transitions in data signals.

BRIEF DESCRIPTION OF THE DRAWINGS

To describe the technical solutions in the implementations of the present technology more clearly, the following briefly describes the accompanying drawings. The accompanying drawings show merely some aspects or implementations of the present technology, and a person of ordinary skill in the art may still derive other drawings from these accompanying drawings without creative efforts.

DETAILED DESCRIPTION

The following describes the technical solutions in the one or more implementations of the present technology. A communications system includes circuits and/or software to utilizes real-time signal quality and channel conditions to determine optimal power consumption modes.

Modern cellular phones operate across a large range of use cases and modulation schemes. Fifth Generation (5G) protocol drives ever-increasing data rates at the cost of higher power consumption due to stringent demands on RF receiver performance. The same RF receiver must also support back-wards compatibility with low data-rate modulation. Conventional receivers design for the most stringent circuit specifications. For example, some conventional receivers switch between high-power and low-power receiver modes based on peak power. However, selections based on peak power only reacts to interferers without frequency discrimination and is prone to false detection (i.e., unnecessarily using a high-power receiver circuit) since the detector does not know the impact of the blocker on the signal quality.

Thus, it is more beneficial to end user experience to adapt the power consumption mode to the application. One or more implementations of the present technology allows RF transceiver to adapt power consumption mode both to un-wanted interferers that cause signal degradation as well as to the throughput demands of the network. For example, the communications system analyzes real-time communication conditions, such as frequency-specific interference levels and/or data rate (via, e.g., a modulation setting), and selects the appropriate receiver circuitry. As an illustrative example, a transceiver can select and utilize a low-power receiver circuit when the data rate is low, the interference is low, and/or the self-transmitted jamming effect is low as defined by corresponding threshold parameters. Further, the receiver can include circuitry/functionalities to repurpose existing transmission detector (e.g., an auxiliary receiver) for analyzing the self-transmitted jamming effect.

Accordingly, the receiver can reduce power consumption based on the increased granularity/accuracy in detecting the low-power applications. Interference detection based on signal quality and self-TX allows for more flexible adaptation to channel conditions with minimal data outage. Using the additional frequency-based analysis (e.g., for the self-transmitted jamming effect) instead of the peak-power based approach, the receiver can reduce false detections and the corresponding power consumptions. The reduction in power consumption can further lead to reductions in heat-related issues (e.g., noise, heat dissipation, circuit density, etc.) and increased battery life for the corresponding device. Moreover, the implementations described below can adapt to the network throughput requirements in addition to un-wanted interference.

In the following description, numerous specific details are set forth to provide a thorough understanding of the presently described technology. In other implementations, the techniques introduced here can be practiced without these specific details. In other instances, well-known features, such as specific functions or routines, are not described in detail in order to avoid unnecessarily obscuring the present technology. References in this description to "an implementation," "one implementation," or the like mean that a particular feature, structure, material, or characteristic being described is included in at least one implementation of the described technology. Thus, the appearances of such phrases in this specification do not necessarily all refer to the same implementation. On the other hand, such references are not necessarily mutually exclusive either. Furthermore, the particular features, structures, materials, or characteristics can be combined in any suitable manner in one or more implementations. It is to be understood that the various implementations shown in the figures are merely illustrative representations and are not necessarily drawn to scale.

Several details describing structures or processes that are well-known and often associated with communications systems and subsystems, but that can unnecessarily obscure some significant aspects of the disclosed techniques, are not set forth in the following description for purposes of clarity. Moreover, although the following description sets forth several implementations of different aspects of the present technology, several other implementations can have different configurations or different components than those described in this section. Accordingly, the disclosed techniques can have other implementations with additional elements or without several of the elements described below.

Many implementations or aspects of the technology described below can take the form of computer- or processor-executable instructions, including routines executed by a programmable computer or processor. Those skilled in the relevant art will appreciate that the described techniques can be practiced on computer or processor systems other than those shown and described below. The techniques described herein can be implemented in a special-purpose computer or data processor that is specifically programmed, configured, or constructed to execute one or more of the computer-executable instructions described below. Accordingly, the terms "computer" and "processor" as generally used herein refer to any data processor. Information handled by these computers and processors can be presented at any suitable display medium, including a liquid crystal display (LCD). Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The terms "coupled" and "connected," along with their derivatives, can be used herein to describe structural relationships between components. It should be understood that these terms are not intended as synonyms for each other. Rather, in particular implementations, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both. The term "and/or" in this specification is only an association relationship for describing the associated objects, and indicates that three relationships may exist, for example, A and/or B may indicate the following three cases: A exists separately, both A and B exist, and B exists separately. In addition, the character "/" in this specification generally indicates an "or" relationship between the associated objects.

Suitable Environments

Figure 1:
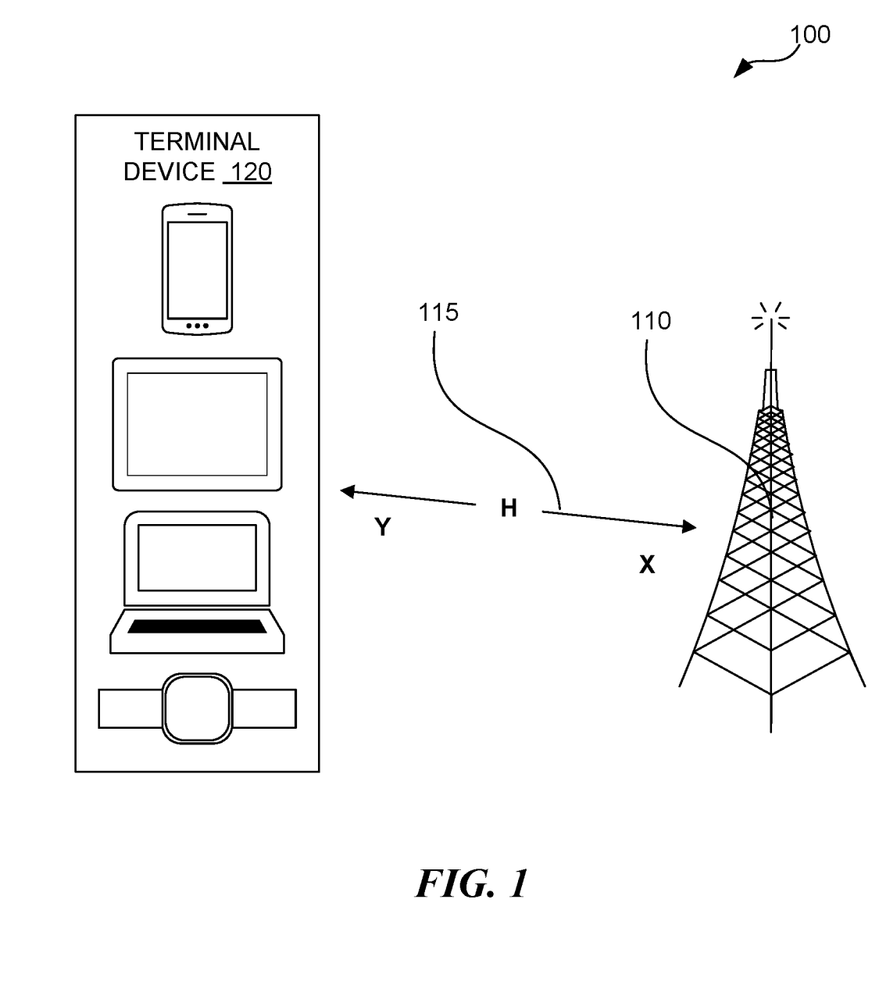
FIG. 1 is an illustration of a wireless communication system in accordance with one or more implementations of the present technology.

FIG. 1 is an illustration of a wireless communication system in accordance with one or more implementations of the present technology. As shown in FIG. 1, the wireless communications system 100 can include a network device 110. The network device 110 can include circuitry configured to provide communication coverage for a specific geographic area. Some examples of the network device 110 can include: a base transceiver station (Base Transceiver Station, BTS), a NodeB (NodeB, NB), an evolved Node B (eNB or eNodeB), a Next Generation NodeB (gNB or gNode B), a Wireless Fidelity (Wi-Fi) access point (AP). Additional examples of the network device 110 can include a relay station, an access point, an in-vehicle device, a wearable device, and the like. The network device 110 can include other wireless connection devices for communication networks such as: a Global System for Mobile Communications (GSM) network, a Code Division Multiple Access (CDMA) network, a Wideband CDMA (WCDMA) network, an LTE network, a cloud radio access network (Cloud Radio Access Network, CRAN), an Institute of Electrical and Electronics Engineers (IEEE) 802.11-based network (e.g., a Wi-Fi network), an Internet of Things (IoT) network, a device-to-device (D2D) network, a next-generation network (e.g., a 5G network), a future evolved public land mobile network (Public Land Mobile Network, PLMN), or the like. Optionally, a 5G system or network may be further referred to as a new radio (New Radio, NR) system or network.

Additionally or alternatively, the wireless communications system 100 can include a terminal device 120. The terminal device 120 can be an end-user device configured to facilitate wireless communication. The terminal device 120 can be configured to wirelessly connect to the network device 110 (via, e.g., a wireless channel 115) according to one or more corresponding communication protocols/standards. The terminal device 120 may be mobile or fixed. The terminal device 120 can be an access terminal, a UE, a user unit, a user station, a mobile site, a mobile station, a remote station, a remote terminal, a mobile device, a user terminal, a terminal, a wireless communications device, a user agent, or a user apparatus. Some examples of the terminal device 120 can include: a cellular phone, a smart phone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, an IoT device, a terminal device in a future 5G network, a terminal device in a future evolved PLMN, or the like.

For illustrative purposes, FIG. 1 illustrates the wireless communications system 100 via the network device 110 and the terminal device 120. However, it is understood that the wireless communications system 100 can include additional/other devices, such as additional instances of the network device 110 and/or the terminal device 120, a network controller, a mobility management entity, etc.

Signal Interference

FIG. 2A-FIG. 2D are illustrations of example interference scenarios in accordance with one or more implementations of the present technology. Each scenario illustrates a signal strength (e.g., a measured power level) for frequencies/bandwidths of a received signal 200. The received signal 200 can be a communication signal (e.g., a wireless signal) from the network device 110 of FIG. 1 (e.g., a base station) received at the terminal device 120 of FIG. 1 (e.g, a UE).

Each scenario can illustrate a signal strength of a target data portion 202 relative to strengths of interference portions 212 and/or a transmission jamming portion 214. The signal strength can be represented along a vertical direction (e.g., y-axis) and the frequencies/bandwidths can be illustrated along a lateral direction (e.g., x-axis). The target data portion 202 can represent the payload or content intended for the receiving terminal device 120 and correspond to a bandwidth or frequencies assigned the receiving terminal device 120. The interference portions 212 can correspond to signals sent to/from other communicating devices (e.g., other UEs). The interference portions 212 can correspond to frequencies and/or bandwidths adjacent to or within a threshold amount from a targeted bandwidth/frequency for the target data portion 202 intended for the relevant device (e.g., the terminal device 120). The transmission jamming portion 214 can represent a signal sent from/by the terminal device 120 to the network device 110 and correspond to the assigned uplink bandwidth.

Figure 2A:
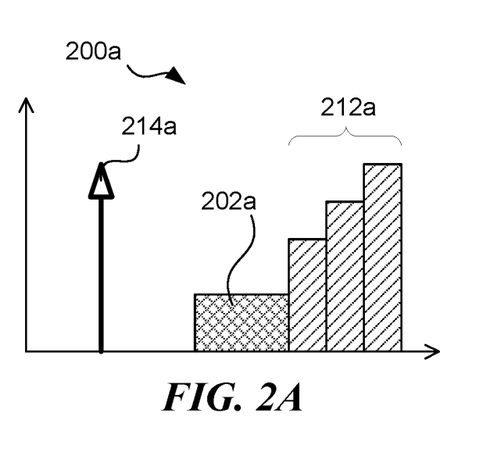
FIG. 2A-FIG. 2D are illustrations of example interference scenarios in accordance with one or more implementations of the present technology.

FIG. 2A illustrates a received signal 200a representative of a strong interference scenario. The received signal 200a for the strong interference scenario can include interference portions 212a and/or a transmission jamming portion 214a that have strengths (e.g., measured power levels) greater than that of a target data portion 202a. The target data portion 202a can correspond to a receiving frequency band (e.g., a unique or exclusive continuous range/region of frequencies) assigned to the receiving device. The transmission jamming portion 214a and the interference portions 212a can each correspond to a unique frequency band. In some implementations, one or more of the interference portions 212a and/or the transmission jamming portion 214a can be separated by an intermediate band of separating frequencies. The receiving frequency band may be within the intermediate band and between the one or more of the interference portions 212a and/or the transmission jamming portion 214a. One or more of the interference portions 212a and/or the transmission jamming portion 214a may be within a frequency band that is adjacent to or abutting the receiving frequency band.

As an example, the strong interference scenario can correspond to communications that occur when the terminal device 120 is located at an edge of an area covered by the network device 110 (e.g., at cell edge). Accordingly, the power in the target data portion 202a can be reduced (via, e.g., fading) due to the distance separating the terminal device 120 and the network device 110. In contrast, the uplink signal generated by the terminal device 120 may be increased to overcome such power reduction and reach the network device 110. The interference portions 212a can correspond to signals sent to or generated by other nearby devices.

Figure 2B:
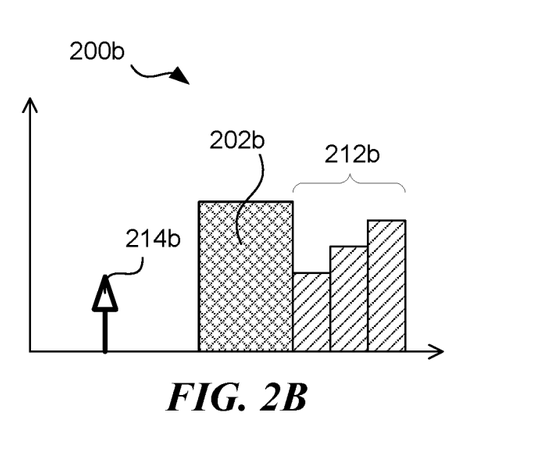

FIG. 2B illustrates a received signal 200b representative of a moderate interference scenario. The received signal 200b for the strong interference scenario can include interference portions 212b and/or a transmission jamming portion 214b that have strengths (e.g., measured power levels) less than or comparable to that of a target data portion 202b. As an example, the moderate interference scenario can correspond to the terminal device 120 being located in an inner portion (e.g., away from the edge) of an area by the network device 110. The moderate interference scenario can represent a common field scenario (e.g., occurring in more than half of the total communications).

Figure 2C:
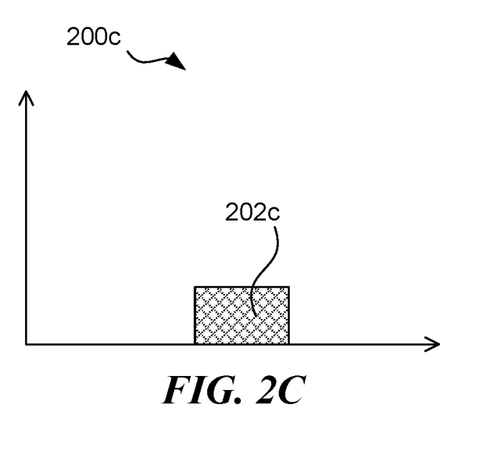

FIG. 2C illustrates a received signal 200c representative of a clean channel, low throughput scenario. The received signal 200c can include a target data portion 202c without any noticeable interferences or jamming portions. The represented scenario can correspond to when the terminal device 120 is relatively close to (e.g., within a threshold distance from) the network device 110, geographically/ spatially separate (e.g., beyond a threshold distance) from other devices, and/or other preferred wireless communication conditions for reducing interferences. The represented scenario can also correspond to low throughput conditions, such as due to content or demand, assigned settings, environmental factors, and/or other communication factors. For example, the represented condition can correspond to idle paging communications.

Figure 2D:
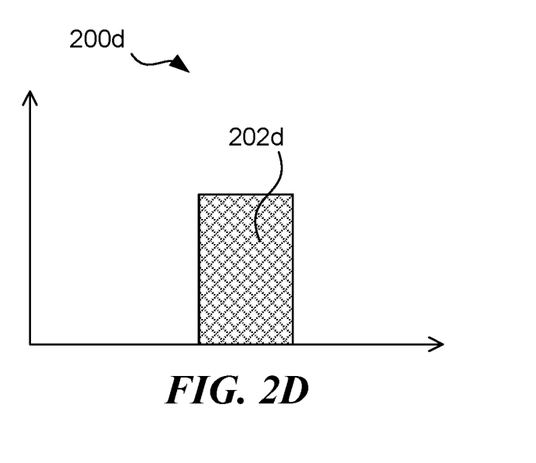

FIG. 2D illustrates a received signal 200d representative of a clean channel, high throughput scenario. The received signal 200d can include a target data portion 202d without any noticeable interferences or jamming portions. The represented scenario can be similar to that represented in FIG. 2C but with higher data throughput rate, such as due to content or demand, assigned settings, environmental factors, and/or other communication factors. For example, the represented condition can correspond to communications for video, gaming, and/or other high-throughput applications.

Wireless Communication Architecture

Figure 3:
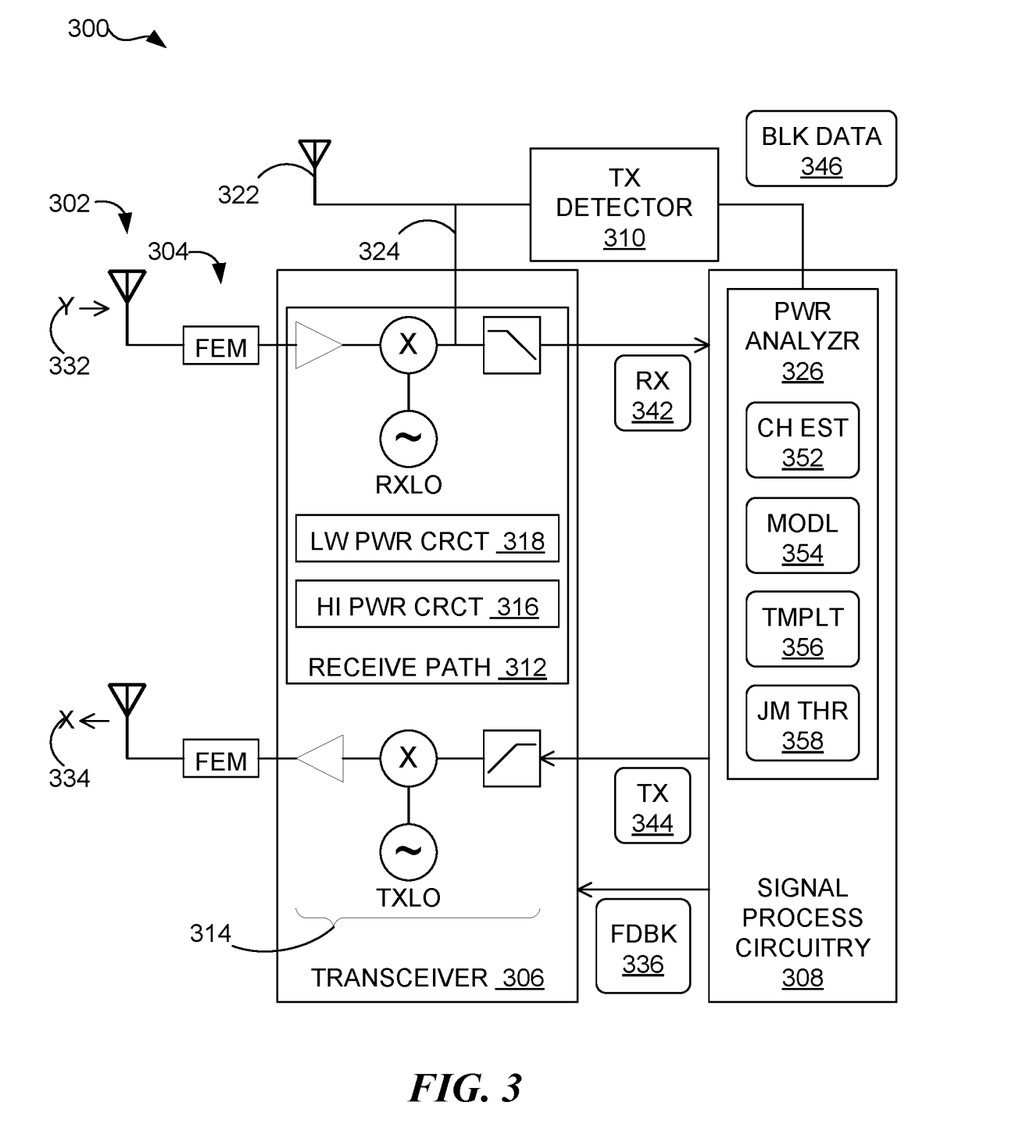
FIG. 3 is a block diagram of a mobile communication device in accordance with one or more implementations of the present technology.

FIG. 3 is a block diagram of a mobile communication device 300 (e.g., the terminal device 120 of FIG. 1, the network device 110 of FIG. 1, and/or a portion therein) in accordance with one or more implementations of the present technology.

The mobile communication device 300 can include circuitry configured to communicate wireless signals with another device. For example, the terminal device 120 (e.g., a UE) can include the mobile communication device 300 configured to exchange wireless signals with the network device 110 and/or other wirelessly coupled devices. In some implementations, the mobile communication device 300 can be configured to communicate according to Fourth Generation (4G) standard, 5G standard, 802.11 standard, and/or other New Radio standard. The mobile communication device 300 can further be backwards compatible and support one or more preceding or older communication standards/ protocols (e.g., Third Generation (3G)).

The mobile communication device 300 can include an antenna group 302 that includes a set of transmission and/or receiver antennas. The antenna group 302 can be configured to utilize one or multiple antennas to exchange wireless signals with a corresponding device. In some implementations, the antenna group 302 can be coupled to a front-end module (FEM) 304 configured to condition the received/ outgoing signals. For example, the FEM 304 can include a set of frequency-based filters, such as a set of band-pass filters configured to isolate a specific frequency range utilized or targeted by the technology, standard, and/or context associated with the communication session.

The mobile communication device 300 can include a transceiver 306 coupled to the antenna group 302. The transceiver 306 can be part of an RF Front-End (RFFE) chip and include circuitry configured to process various components of wireless signals. For example, the transceiver 306 can include a receive path 312 and a transmission path 314.

The receive path 312 can include circuitry configured to receive communication signals from another device. In some implementations, the receive path 312 can include an amplifier (e.g., a low-noise amplifier (LNA)), a down-converter, one or more filters (e.g., a low-pass filter), a sampling circuit (e.g., an analog-to-digital (A/D) converter), or a combination thereof. For example, the receive path 312 can use the amplifier to control the power in a received signal 332 (e.g., an output from one or more receive antennas). The down-converter (represented by a mixer/multiplier and a receive local oscillator (RXLO) in FIG. 3) can convert the wireless signal from a carrier frequency to a baseband signal. The converted signal can be filtered (via, e.g., a low-pass filter to remove high-frequency noise) and sampled to generate a digital stream of received baseband data 342. The received baseband data 342 can be provided to a signal processing circuitry 308, which may be configured to recover the content according to one or more predetermined processes (e.g., detection, decoding, interleaving, etc.).

The transmission path 314 can include circuitry configured to send communication signals to another device. In some implementations, the transmission path 314 can include a signal generator (e.g., a digital-to-analog (D/A) converter), one or more filters (e.g., high-pass and/or band-pass filters), an up-converter, an amplifier, or a combination thereof. For example, the transmission path can receive a digital stream of transmission baseband data 344 that includes a message content as processed by the signal processing circuitry 308 (via, e.g., encoding, interleaving, modulating, etc.). The digital data 344 may be converted to an analog signal via the D/A converter and/or the may be filtered signal (e.g., before and/or after analog conversion) to remove various noise components (e.g., DC power). The up-converter (represented by a mixer/multiplier and a transmission local oscillator (TXLO) in FIG. 3) can transform/modulate the signal from baseband to a carrier frequency. The up-converted signal can be amplified to power levels appropriate for transmission. The resulting signal can be transmitted as transmission signal 334 through the transmission antenna.

In some implementations, the transceiver 306 can include two or more circuitries configured to provide similar functions, such as for processing received signals or transmission signals, at different power levels. For example, the transceiver 306 can include a high-power circuit 316 and a low-power circuit 318 both configured to process the received signal 332 at the different corresponding power levels. The low-power circuit 318 can include components/designs that perform the same function as the high-power circuit 316 but using less power. The trade-off in power may negatively affect the resulting accuracy or signal reliability. As described in detail below, the mobile communication device 300 can be configured to dynamically select and use the different powered circuits according to real-time environmental/signal factors.

For example, the mobile communication device 300 can utilize the low-power circuit 318 for communication scenarios or condition, such as lower interference environments and/or lower throughput requirements, that may be less affected by any reduction in accuracy/reliability. Accordingly, the mobile communication device 300 can take advantage of the power reduction without increasing the error rates, retransmission, etc.

The signal processing circuitry 308 (e.g., a baseband modem/chip) can be configured to process/analyze the received baseband data 342 with respect to the communicated/intended content. For example, the signal processing circuitry 308 can be configured to assess the wireless channel 115 of FIG. 1 and determine a channel estimate 352 (e.g., a description of the changes or effects provided by the wireless channel 115 on the transmitted signal). The signal processing circuitry 308 can identify and analyze changes to a known signal pattern (e.g., a reference portion) in the received signal 332 to determine the channel estimate 352. The signal processing circuitry 308 can use the channel estimate 352 to negate the interference, the noise, and/or other alternations in the received signal 332 and recover the originally transmitted content.

The signal processing circuitry 308 can further determine communication parameters associated with overall throughput of the data. For example, the signal processing circuitry 308 can determine a modulation profile 354 (e.g., a modulation scheme or constellation, such as 64 Quadrature Amplitude Modulation (QAM) or Binary Phase Shift Keying (BPSK)) used in communicating the received signal 332. The modulation profile 354 can correspond to a number/quantity of bits for each symbol. The signal processing circuitry 308 can be configured to determine the modulation profile 354 according to a portion of the received signal 332 (e.g., a control portion), an application or a process designated by the received signal 332, the channel estimate 352, data exchanged with the network device 110, and/or other communication parameters.

The signal processing circuitry 308 can determine the channel estimate 352 and/or the modulation profile 354 for processing the received signal 332. In other words, conventional devices may be configured to estimate the channel and/or determine the modulation in processing received communication signals. As described below, the mobile communication device 300 can leverage existing circuitry and/or data already used to process the received signal 332 (e.g., the channel estimate 352 and/or the modulation profile 354) to select between the low-power circuit 318 and the high-power circuit 316 for the signal processing.

The mobile communication device 300 may further include a transmission detector 310 and/or a transmission sensing circuit 322 configured to detect and/or measure predetermined aspects of the transmission signal 334. For example, the transmission detector 310 and/or the transmission sensing circuit 322 (e.g., an antenna and/or a feedback loop) can be configured to detect power levels in the transmission signal 334. The mobile communication device 300 can use the measured power levels to tune the outgoing transmission signals 334 and match the power levels appropriate for the corresponding communication session (e.g., as designated by the base station).

The mobile communication device 300 can include a self-sensing circuit 324 configured to route the received signal 332 or a processed portion thereof to the transmission detector 310. The mobile communication device 300 can include the self-sensing circuit 324 to repurpose the transmission detector 310 (e.g., an auxiliary receiver) for use in selecting the appropriate power-levels for processing the received signal 332. For example, since the mobile communication device 300 is generating the transmission signal 334, the transmission detector 310 can determine the power in the transmission signal 334, such as according to the bandwidth used for the transmission. The transmission detector 310 can generate a blocking data 346 as a result to represent an amount of power in the transmission signal 334. In other words, the self-sensing circuit 324 can repurpose the transmission detector 310 to analyze the self-generated jamming component 214a of FIG. 2A in the received signal 332. The blocking data 346 can represent the self-generated jamming component 214a or an effect thereof in the received signal 332.

The mobile communication device 300 can include a power analyzer 326 (e.g., circuitry, software and/or firmware module, or a combination thereof) configured to analyze the real-time communication conditions associated with the received signal 332. For example, the power analyzer 326 can analyze the self-generated jamming component and/or the interference portions (e.g., 212a of FIG. 2A or 212b of FIG. 2B). Also, the power analyzer 326 can compare the target data portion (e.g., 202a-d of FIGS. 2A-2D) in the received signal 332 to other portions therein. In some implementations, the power analyzer 326 can derive a signal-to-noise ratio (SNR) or a derivation thereof (e.g., a running average) for the received signal 332 using the channel estimate 352. Additionally or alternatively, the power analyzer 326 can determine or track the modulation profile 354.

The mobile communication device 300 can select the appropriate power-level for processing the received signal 332 based on the analyzed information. In some implementations, the power analyzer 326 can compare the average SNR to a predetermined signal template 356. The signal template 356 can represent a predetermined signal pattern or strength that is desired for optimum signal processing (e.g., a high SNR). Accordingly, a difference between the signal template 356 and the average SNR can represent the amount of interference (e.g., power in the interference portions 212) relative to the target data portion 202. The power analyzer 326 can compare the calculated difference to a predetermined threshold to select the appropriate power circuit.

Additionally or alternatively, the power analyzer 326 can compare the modulation profile 354 (e.g., a data rate) to a corresponding threshold (e.g., a portion of the signal template 356) for selecting the appropriate circuit. Further, the power analyzer 326 can compare the blocking data 346 to a jamming threshold 358 for selecting the appropriate circuit.

As an illustrative example, the power analyzer 326 can select the low-power circuit 318 when the calculated difference the data rate is below respective thresholds as specified in the signal template 356. In other words, the power analyzer 326 can determine that the low-power circuit 318 is appropriate when the interference levels and/or data rates are lower than predetermined threshold levels. The power analyzer 326 can otherwise determine that the high-power circuit 316 is appropriate for processing the received signal 332. Also, the power analyzer 326 can select the high-power circuit 316 (e.g., regardless of or overriding the SNR analysis) when the blocking data 346 represents the transmission jamming portions 214 exceeding the jamming threshold 358.

In some implementations, the power analyzer 326 can generate a feedback signal 336 that corresponds to the circuit selection. The transceiver 306 can receive the feedback signal 336 and accordingly select between the low-power circuit 318. In other implementations, the power analyzer 326 can provide the feedback signal 336 including the channel estimate 352, the modulation profile 354, and/or the processing derivations thereof described above to the transceiver 306. The transceiver 306 can perform the threshold comparisons as described above instead of the signal processing circuitry 308. The transceiver 306 can similarly select the low/high power circuit based on the local comparison. Further details regarding the analysis and selection for the different power-level circuits are discussed below.

Example Jamming-Detection Circuit

Figure 4:
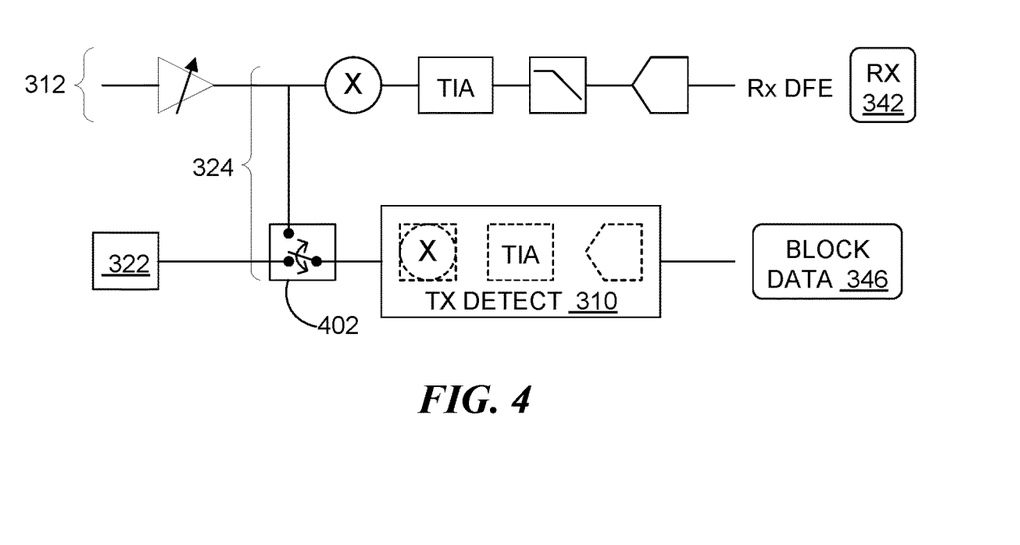
FIG. 4 is a detailed block diagram of an example condition detection circuit in accordance with one or more implementations of the present technology.

FIG. 4 is a detailed block diagram of an example condition detection circuit 400 (e.g., the receive path 312, the transmission detector 310, and/or the self-sensing circuit 324) in accordance with one or more implementations of the present technology. In some implementations, the receive path 312 can include a first amplifier (e.g., an LNA), a mixer, an RXLO (not shown in FIG. 4 for simplicity), a second amplifier (e.g., a transimpedance amplifier (TIA), a baseband filter, and/or an A/D converter. The output from the receive path 312 can be provided to an equalizer circuit (e.g., a receiver decision feedback equalizer (DFE)) used to provide symbol decisions and/or feedback for removing intersymbol interference. The receive path 312 can generate the received baseband data 342 as described above.

In some implementations, the transmission detector 310 can include a mixer, an amplifier, and/or an A/D converter configured to determine (e.g., isolate) the transmission signal 334. The condition detection circuit 400 can include the self-sensing circuit 324 configured to repurpose the transmission detector 310 to determine the transmission jamming portion 214a-b of FIGS. 2A-2B in the received signal 332 of FIG. 3. For example, the self-sensing circuit 324 can include an electrical path configured to route the output of the first amplifier to the transmission detector 310.

The self-sensing circuit 324 can include a self-sensing switch 402 configured to selectively connect the transmission detector 310 to the receive path 312 and the transmission sensing circuit 322. For example, the self-sensing circuit 324 can tap out spectrum from wideband LNA and mixer and provide the result to the transmission detector 310. The self-sensing switch 402 can be configured/controlled to connect the transmission detector 310 to the receive path 312 based on a predetermined frequency (e.g., once every n number of frames) and/or as dynamically determined according to frontend filtering performance (e.g., band-specific performance). Also, the self-sensing switch 402 can be configured to connect the transmission detector 310 to the receive path 312 whenever the transmission path 314 of FIG. 3 activates (e.g., sending the transmission signal 334) and/or whenever the receive path 312 is active (e.g., actively receiving/processing the received signal 332).

When connected to the receive path 312, the transmission detector 310 can be configured to detect/analyze the transmission jamming portion 214a-b in the received signal 332. In some implementations, the transmission detector 310 can function similar to a match filter since the transmitted information is known at the mobile communication device 300. Also, the transmission detector 310 can be configured to target (via, e.g., one or more weighing factors) and/or analyze one or more frequency bands, such as band 25 that is closer to the receive band than other transmission bands. The transmission detector 310 can generate the blocking data based on the power in the detected transmission jamming portion 214a-b.

Example Power-Selected Receiver Circuit

Figure 5:
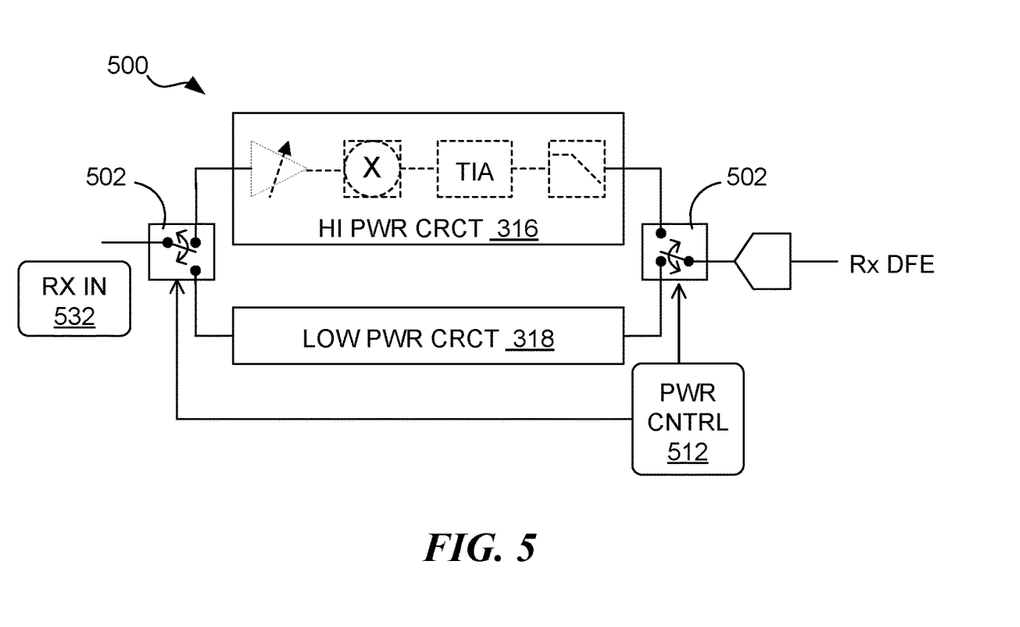
FIG. 5 is a detailed block diagram of an example receiver circuit in accordance with one or more implementations of the present technology.

FIG. 5 is a detailed block diagram of an example receiver circuit 500 (e.g., the mobile communication device 300 of FIG. 3 or a portion thereof) in accordance with one or more implementations of the present technology. The receiver circuit 500 can include a power selection circuit 502 configured to select receiver-processing circuitry associated with the appropriate power consumption-level for the real-time communication environment. For example, the power selection circuit 502 can include a set of switches configured to select between the high-power circuit 316 and the low-power circuit 318 for processing a received signal input 532 (e.g., an intermediate processing data resulting from the received signal 332 of FIG. 3). In other words, the power selection circuit 502 can reduce the power required to process the received signal input 532 according to the real-time communication conditions, such as the channel estimate 352 of FIG. 3, the modulation profile 354 of FIG. 3, the SNR or a limited/running average thereof, the blocking data 346 of FIG. 3 (e.g., the power in the transmission jamming portion), or a combination thereof.

As described in detail below, the power analyzer 326 of FIG. 3, the signal processing circuitry 308 of FIG. 3, the transceiver 306 of FIG. 3, and/or another processing circuitry can be configured to analyze the real-time communication conditions and generate a selection signal 512 accordingly. In some implementations, the signal processing circuitry 308 can analyze the real-time conditions and generate the feedback signal 336 of FIG. 3 that includes the selection signal 512. In other implementations, the signal processing circuitry 308 can provide to the transceiver 306 or another decision-making circuitry the feedback signal 336 including the channel estimate 352, the modulation profile 354, the SNR data, the blocking data 346, a comparison result thereof to a corresponding threshold, or a combination thereof. Accordingly, the transceiver 306 or the decision-making circuitry can generate the selection signal 512 according to the received data. The power selection circuit 502 can receive the selection signal 512 and operate accordingly to select the corresponding receiver-processing circuitry (e.g., between the high-power circuit 316 and the low-power circuit 318).

Control Flow

Figure 6:
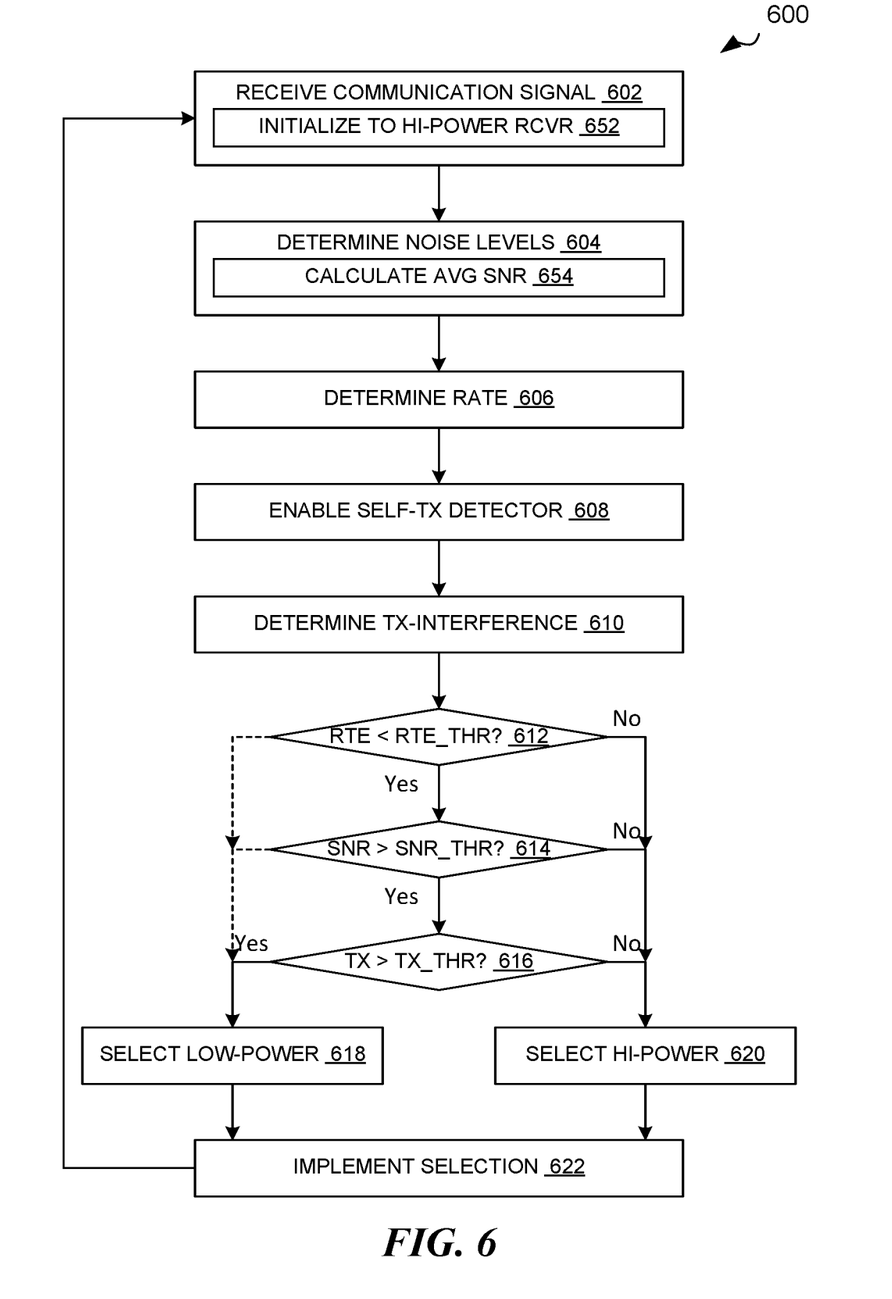
FIG. 6 is a flowchart of an example method in accordance with one or more implementations of the present technology.

FIG. 6 is a flowchart of an example method 600 in accordance with one or more implementations of the present technology. The method 600 can be for controlling the power consumption level associated with received signal processing. The method 600 can be for operating the network device 110 of FIG. 1, the terminal device 120 of FIG. 1, the mobile communication device 300 of FIG. 3, a portion thereof, or a combination thereof.

At block 602, the mobile communication device 300 (via, e.g., the antenna group 302 of FIG. 3) can receive the received signal 332 of FIG. 3. The received signal 332 can include the target data portion (e.g., portions 202a-d of FIGS. 2A-2D) in the designated receiving frequencies/frequency band. The received signal 332 may further include one or more interference and/or jamming portions (e.g., portions 212a-b of FIGS. 2A-2B and/or 214a-b of FIGS. 2A-2B).

The mobile communication device 300 can process the received signal 332 using the receive path 312 of FIG. 3. At block 652, the mobile communication device 300 can initialize the receive path 312 to utilize the high-power circuit 316 of FIG. 3 in processing the received signal 332. In other words, the mobile communication device 300 can initially process the received signal 332 using the high-power circuit 316, such as during a beginning portion of a communication session.

At block 604, the mobile communication device 300 can determine noise levels in the received signal 332. For example, the receive path 312 and/or the signal processing circuitry 308 of FIG. 3 can calculate power levels at one or more frequency regions (e.g., frequency bands predetermined or designated according to a corresponding communication protocol) outside of or separate from the receiving frequency band. Also, the mobile communication device 300 can calculate an SNR that represents a relationship between power/energy levels in the target data portion in comparison to the interference portions and/or the transmission jamming portion. In some implementations, as illustrated at block 654, the mobile communication device 300 can calculate an average SNR, such as a running average over the most recent n number of communication frames including the current frame.

At block 606, the mobile communication device 300 can determine a rate associated with the received signal 332. The mobile communication device 300 (via, e.g., the signal processing circuitry 308) can determine the rate based on determining the modulation profile 354 (e.g., a modulation scheme that controls a number of bits per each symbol) associated with the received signal 332. Accordingly, the mobile communication device 300 can determine a data rate (e.g., a throughput rate) for the received signal 332 according to the modulation profile 354.

At block 608, the mobile communication device 300 can enable the self-transmission detector circuit. The mobile communication device 300 can use/repurpose the transmission detector 310 of FIG. 3 via the self-sensing circuit 324 of FIG. 3 to detect the amount of interference caused by the self-generated transmission signal 334 of FIG. 3. For example, the mobile communication device 300 can operate the self-sensing circuit 324, such as by controlling the self-sensing switch 402 of FIG. 4, to connect the transmission detector 310 to the receive path 312 instead of the transmission sensing circuit 322. Accordingly, the mobile communication device 300 can redirect or repurpose the transmission detector 310, which may be initially configured to tune power levels in signals transmitted by the mobile communication device 300, to analyze the transmission jamming portion in the received signal. In some implementations, the mobile communication device 300 can connect the transmission detector 310 to the receive path 312 according to a predetermined interval (e.g., every n communication frames). Additionally or alternatively, the mobile communication device 300 can connect the transmission detector 310 to the receive path 312 when the transceiver 306 of FIG. 3 outputs or transmits the transmission signal 334.

At block 610, the mobile communication device 300 can determine the transmission interference in the received signal 332. Based on the connection between the transmission detector 310 to the receive path 312, the mobile communication device 300 can calculate an amount of power or energy in one or more frequency bands that correspond to the transmission signal 334. In other words, the mobile communication device 300 can calculate the power in the transmission jamming portion of the received signal 332. Accordingly, the mobile communication device 300 can determine an amount of energy in the transmission signal 334 contemporaneously transmitted with the received signal 332 and interfering with the target data portion 202 therein.

At decision blocks 612-616, the mobile communication device 300 can analyze one or more of the above-described processing results (e.g., representations of corresponding real-time communication conditions) to select a receive path and a corresponding power level. For example, the mobile communication device 300 (via, e.g., the power analyzer 326, the signal processing circuitry 308, and/or the transceiver 306) can select between the high-power circuit 316 and the low-power circuit 318 to process the received signal 332.

As an illustrative example, the receive path 312 can be initialized to process the received signal 332 using the high-power circuit 316 as described above. When one or more real-time communication conditions satisfy a corresponding condition, the mobile communication device 300 can select the low-power circuit 318 instead of the high-power circuit 316.

At decision block 612, the mobile communication device 300 can determine whether the determined rate is below a corresponding rate threshold (e.g., the signal template 356). The mobile communication device 300 can select the low-power circuit 318 when the determined rate is below the rate threshold. Otherwise, the mobile communication device 300 can select the high-power circuit 316. Additionally or alternatively, the mobile communication device 300 can compare the modulation profile 354 to a set of predetermined modulation schemes. The mobile communication device 300 can select the low-power circuit 318 when the modulation profile 354 matches one of the predetermined modulation schemes that correspond to a lower-rate modulation scheme.

At decision block 614, the mobile communication device 300 can determine whether the noise levels are below corresponding thresholds. For example, the mobile communication device 300 can compare the SNR (e.g., a difference between power levels in the target data portion and the interference portions) to an SNR threshold. The mobile communication device 300 can select the low-power circuit 318 when the SNR exceeds the SNR threshold. In other words, the mobile communication device 300 can select the low-power circuit 318 when the noise/interference levels are below the corresponding threshold. Otherwise, the mobile communication device 300 can select the high-power circuit 316.

At decision block 616, the mobile communication device 300 can determine whether the transmission interference exceeds a corresponding threshold. For example, the mobile communication device 300 can compare the determined power level of the transmission jamming portion to the jamming threshold 358 of FIG. 3. The mobile communication device 300 can select the low-power circuit 318 when the power in the transmission signal 334 is negligible (e.g., as defined by the threshold).

At blocks 618 and 620, the mobile communication device 300 can generate the selection signal 512 of FIG. 5 according to one or more analysis results of the real-time communication conditions. At block 618, the mobile communication device 300 can generate the selection signal 512 for selecting the low-power circuit 318. At block 620, the mobile communication device 300 can generate selection signal 512 for selecting the high-power circuit 316. At block 622, the mobile communication device 300 can implement the selection, such as by controlling the power selection circuit 502 of FIG. 5 according to the selection signal 512.

The mobile communication device 300 can continue to receive and analyze the signal and adjust the receiver processing accordingly. For example, as illustrated by the feedback loop, the mobile communication device 300 can continue to receive the communication signal and repeat the processes described above (e.g., blocks 602-622, 652, and 654). The mobile communication device 300 can select/use the circuitry that consumes lower power when the communication conditions require less functionality/accuracy, such as when the data rates are low and/or when the interference levels are lower. Alternatively, when the data rates are high, when interference levels are higher, and/or when the communication conditions require higher signal processing functionalities, the mobile communication device 300 can select/use the circuitry that consumes more power.

In some implementations, the mobile communication device 300 can select the low-power circuit 318 when the data rate is less than the rate threshold, the SNR is greater than the interference threshold, and the transmission interference is lower than the jamming threshold 358. Since the transmission signals are typically bursty (e.g., transmitted sporadically), the mobile communication device 300 can switch from the high-power circuit 316 to the low-power circuit 318 when the interference levels are relatively low (e.g., satisfactory SNR) and the data rates are relatively slower. When the transmission signal 334 is generated, the mobile communication device 300 can evaluate the transmission jamming portion 214 and switch back to the high-power circuit 316 when the jamming interference exceeds the jamming threshold 358.

The signal template 356 (e.g., an expected clean/strong signal) and frequency-specific interference analysis described above can provide increased robustness and power efficiency. The repurposed transmission detector 310 can be used to specifically target and analyze the jamming interference caused by the transmission signal 334. Further, the mobile communication device 300 can include filters and/or other circuitry configured to analyze frequency-specific interference, such as by placing higher weights for bands adjacent to/abutting the receiving frequency band. Accordingly, the mobile communication device 300 can increase the power efficiency by separately analyzing and responding to the bursty transmission jamming portion instead of using peak-power consumption to control the power consumption. The increased power efficiency (e.g., reduction in power consumption) can further lower heat dissipation in the circuitry and increase battery life for corresponding consumer devices. Further, the repurposed transmission detector 310 and the self-sensing circuit 324 provides increased reaction time for responding to real-time communication conditions in comparison to analyzing and responding to general SNR measures.

Example Devices and Systems

Figure 7:
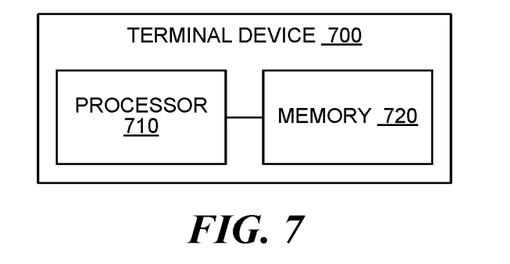
FIG. 7 is a schematic block diagram of a terminal device in accordance with one or more implementations of the present technology.
Figure 8:
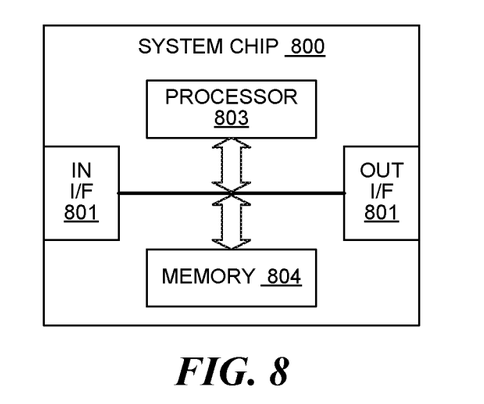
FIG. 8 is a schematic block diagram of a system chip in accordance with one or more implementations of the present technology.
Figure 9:
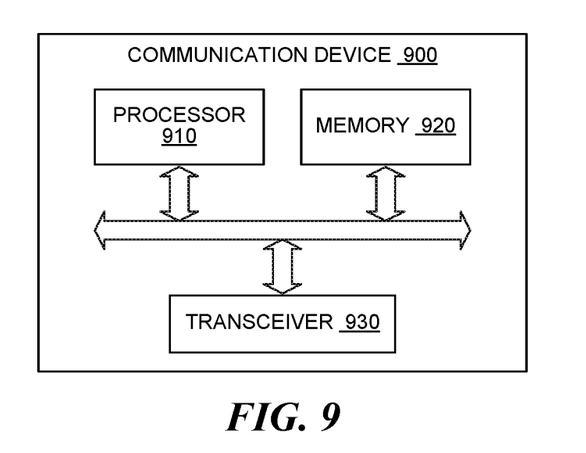
FIG. 9 is a schematic block diagram of a communications device in accordance with one or more implementations of the present technology.

FIGS. 7-9 illustrate example devices and systems that include or incorporate the variable-power receiver and/or the corresponding control circuitry (e.g., the mobile communication device 300 of FIG. 3, the condition detection circuit 400 of FIG. 4, and/or the receiver circuit 500 of FIG. 5).

FIG. 7 is a schematic block diagram of a terminal device 700 (e.g., an instance of the terminal device 120 of FIG. 1) in accordance with one or more implementations of the present technology. As shown in FIG. 7, the terminal device 700 includes a processing unit 710 (e.g., a DSP, a CPU, a GPU, etc., functioning as the transceiver 306 of FIG. 3, the signal processing circuitry 308 of FIG. 3, the transmission detector 310, and/or one or more portions thereof) and a memory 720. The processing unit 710 can be configured to implement instructions that correspond to the method 600 of FIG. 6 and/or other aspects of the implementations described above.

FIG. 8 is a schematic block diagram of a system chip 800 (e.g., a component within the terminal device 120 of FIG. 1 and/or the network device 110 of FIG. 1) in accordance with one or more implementations of the present technology. The system chip 800 in FIG. 8 includes an input interface 801, an output interface 802, a processor 803, and a memory 804 (e.g., a non-transitory, computer-readable medium) that may be connected through an internal communication connection line, where the processor 803 is configured to execute code in the memory 804. The memory 804 can include code that corresponds to the method 600 of FIG. 6 and/or other aspects of the implementations described above. Accordingly, the processor 803 can implement the method 600 and/or other aspects of the implementations described above.

FIG. 9 is a schematic block diagram of a communications device 900 (e.g., an instance of the terminal device 120 of FIG. 1 and/or the network device 110 of FIG. 1) in accordance with one or more implementations of the present technology. The communications device 900 may include a processor 910 and a memory 920. The memory 920 may store program code, and the processor 910 may execute the program code stored in the memory 920. The memory 920 can include code that corresponds to the method 600 of FIG.

6 and/or other aspects of the implementations described above. Accordingly, the processor 910 can implement the method 600 and/or other aspects of the implementations described above.

Optionally, the communications device 900 can include a transceiver 930 (e.g., an instance of the transceiver 306 of FIG. 3, the signal processing circuitry 308 of FIG. 3, the transmission detector 310, and/or one or more portions thereof). The transceiver 930 can be configured (via, e.g., hardware circuit, software code from the memory 920, and/or firmware) to implement the method 600 and/or other aspects of the implementations described above.

It should be understood that the processor in the implementations of this technology may be an integrated circuit chip and has a signal processing capability. During implementation, the steps in the foregoing method may be implemented by using an integrated logic circuit of hardware in the processor or an instruction in the form of software. The processor may be a general-purpose processor, a digital signal processor (DSP), an application specific integrated circuit (ASIC), a field programmable gate array (FPGA) or another programmable logic device, a discrete gate or transistor logic device, and a discrete hardware component. The methods, steps, and logic block diagrams disclosed in the implementations of this technology may be implemented or performed. The general-purpose processor may be a microprocessor, or the processor may be alternatively any conventional processor or the like. The steps in the methods disclosed with reference to the implementations of this technology may be directly performed or completed by a decoding processor implemented as hardware or performed or completed by using a combination of hardware and software modules in a decoding processor. The software module may be located at a random-access memory, a flash memory, a read-only memory, a programmable read-only memory or an electrically erasable programmable memory, a register, or another mature storage medium in this field. The storage medium is located at a memory, and the processor reads information in the memory and completes the steps in the foregoing methods in combination with the hardware thereof.

It may be understood that the memory in the implementations of this technology may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random-access memory (RAM) and is used as an external cache. For exemplary rather than limitative description, many forms of RAMs can be used, and are, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchronous link dynamic random-access memory (SLDRAM), and a direct Rambus random-access memory (DR RAM). It should be noted that the memories in the systems and methods described herein are intended to include, but are not limited to, these memories and memories of any other suitable type.

EXAMPLES

Several aspects of the present technology are set forth in the following additional examples:

1. A method for operating a communications device, the method comprising:
   receiving a signal (e.g., a wireless signal) at the communications device, wherein the signal includes a target data portion corresponding to a receiving frequency band;
   calculating (1) a first power level for a first frequency region in the signal, and (2) a second power level for a second frequency region in the signal, wherein the first and second frequency regions are separate from the receiving frequency band; and
   selecting a low-power circuit for processing the signal based on the first and second power levels, wherein the low-power circuit is configured to process the signal using less power than a high-power circuit.

2. The method of example 1, further comprising:
   initially processing the signal using the high-power circuit;
   wherein:
   the first and second power levels are calculated based on processing the signal using the high-power circuit; and
   selecting the low-power circuit includes switching to the low-power circuit according to real-time communication conditions.

3. The method of examples 1-2, wherein:
   the first power level represents an amount of energy in a transmission signal transmitted by the communications device contemporaneous with receiving the signal; and
   the second power level represents a signal-to-noise ratio (SNR) comparing power levels in frequency bands for a target data portion to one or more additional frequency bands in the signal.

4. The method of examples 1-3, wherein calculating the first power level includes:
   connecting a transmission detector to a receive path using a self-sensing circuit, wherein
      the receive path is configured to process the received signal, and
      the transmission detector is initially configured to tune power levels in signals transmitted by the communication device; and
   calculating the amount of energy in a transmission jamming portion of the received signal, wherein the transmission jamming portion represents interference caused by the contemporaneously transmitted transmission signal.

5. The method of examples 1-4, wherein selecting the low-power circuit includes switching to the low-power circuit when the amount of energy in the transmission jamming portion is below a jamming threshold.

6. The method of examples 1-5, wherein the low-power circuit is selected when the amount of energy in the transmission jamming portion is below the jamming threshold and regardless of the second power level.

7. The method of examples 1-6, wherein:
   calculating the second power level includes calculating a running average for the SNR for a set of recent communication frames; and
   selecting the low-power circuit includes selecting the low-power circuit based on comparing the second power level to a signal template representative of a signal with an acceptable SNR.

8. The method of examples 1-7, wherein selecting the low-power circuit includes:
   calculating a difference between the second power level and the signal template; and
   selecting the low-power circuit when the difference is below a predetermined threshold.

9. The method of examples 1-8, further comprising determining a modulation profile based on the received signal, wherein:
   the modulation profile represents a modulation scheme of the received signal that controls a number of bits per each symbol in the received signal, and
   the low-power circuit is selected when the modulation profile corresponds to a rate below a predetermined rate threshold.

10. The method of examples 1-9, wherein:
    the signal includes a target data portion corresponding to a receiving frequency band;
    the receiving frequency band, the first frequency region, and the second frequency region each include an exclusive continuous range of frequencies;
    the first and second frequency region are separated by an intermediate band of separating frequencies;
    at least one of the first and second frequency region are adjacent to and abutting the receiving frequency band; and
    the low-power circuit is selected when the power in the target data portion exceeds power in adjacent and abutting frequency region by a threshold amount.

11. A non-transitory, computer-readable medium having processor instructions stored thereon that, when executed by one or more processors, cause the one or more processors to perform a method of any one of examples 1-10.

12. A communications device comprising:
    one or more processors; and
    a memory including instructions stored thereon that, when executed by the one or more processors, cause the one or more processors to perform a method of any one of examples 1-10.

13. A communications device comprising:
    a power analysis circuit configured to
       calculate in real-time (1) a first power level for a first frequency region in a received signal and (2) a second power level for a second frequency region, wherein the first and second frequency regions are separate from a receiving frequency band corresponding to a target data portion in the received signal;
       generate a selection signal based on the first and power levels for controlling an amount of power used to process the received signal; and
    a receive path coupled to the power analysis circuit, the receive path including a high-power circuit and a low-power circuit that are configured to process the received signal using different amounts of power, wherein the receive path is configured to select between the high-power circuit and the low-power circuit according to the selection signal.

14. The communications device of example 13, further comprising:
    a transmission detector initially configured to tune power levels in signals transmitted by the communication device;
    a self-sensing circuit connected between the transmission detector and the receive path, the self-sensing circuit configured to connect the receive path to the transmission detector for using the transmission detector to determine an amount of transmission interference in the received signal caused by a transmission signal transmitted by the communication device concurrent with receiving the received signal; and
    wherein:
    the power analysis circuit is configured to select the low-power circuit when the amount of transmission interference is below a jamming threshold.

15. The communications device of examples 13-14, wherein:
    the receive path includes a mixer configured to demodulate the received signal to a baseband signal in processing the received signal; and
    the self-sensing circuit is configured to tap out a frequency spectrum of the received signal before the mixer, wherein the frequency spectrum corresponds to the transmission signal.

16. The communications device of examples 13-15, wherein the self-sensing circuit includes a self-sensing switch configured to selectively disconnect the transmission detector from a transmission sensing circuit and connect to the receive path, wherein the self-sensing switch is operated according to a predetermined duration for determining the amount of transmission interference.

17. The communications device of examples 13-16, wherein the self-sensing circuit includes a self-sensing switch configured to selectively disconnect the transmission detector from a transmission sensing circuit and connect to the receive path when the communications device transmits the transmission signal.

18. The communications device of examples 13-17, wherein:
    the power analysis circuit is configured to calculate a signal-to-noise ratio (SNR) that represents a comparison between the target data portion and the first and/or second power levels; and
    the receive path is configured to select the low-power circuit when the SNR is above a noise threshold.

19. The communications device of examples 13-18, wherein:
    the power analysis circuit is configured to determine a modulation profile associated with a data rate for the received signal; and
    the receive path is configured to select the low-power circuit when the data rate is above a rate threshold.

20. The communications device of examples 13-19, wherein:
    the power analysis circuit is configured to determine a modulation profile associated with a data rate for the received signal; and
    the receive path is configured to select the low-power circuit when the modulation profile matches a predetermined modulation.

21. The communications device of examples 13-20, wherein:
    the power analysis circuit is configured to calculate the first and/or the second power levels based on power in a frequency band within the received signal adjacent to a frequency band of the target data portion; and
    the receive path is configured to select the low-power circuit when the power in the adjacent frequency band is below an interference power threshold.

22. The communications device of examples 13-21, wherein:
    the power analysis circuit comprises a baseband chip; and
    the receive path comprises a transceiver and/or a front-end chip.

23. The communications device of examples 13-22, wherein the received signal corresponds to a Fourth Generation (4G) standard, a Fifth Generation (5G) standard, an 802.11 standard, and/or a New Radio standard.

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the described technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative implementations or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology, as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

A person of ordinary skill in the art may be aware that, in combination with the examples described in the implementations disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A method for operating a communications device, the method comprising:
   receiving a wireless signal at the communications device, wherein the wireless signal includes a target data portion corresponding to a receiving frequency band;
   calculating (1) a first power level for a first frequency region in the wireless signal, and (2) a second power level for a second frequency region in the wireless signal, wherein the first and second frequency regions are separate from the receiving frequency band; and
   selecting a low-power circuit for processing the wireless signal based on the first and second power levels, wherein the low-power circuit is configured to process the wireless signal using less power than a high-power circuit,
   wherein:
   the first power level represents an amount of energy in a transmission signal transmitted by the communications device contemporaneous with receiving the wireless signal; and
   the second power level represents a signal-to-noise ratio (SNR) comparing power levels in frequency bands for a target data portion to one or more additional frequency bands in the wireless signal.

2. The method of claim 1, further comprising:
   initially processing the wireless signal using the high-power circuit;
   wherein:
   the first and second power levels are calculated based on processing the wireless signal using the high-power circuit; and
   selecting the low-power circuit includes switching to the low-power circuit according to real-time communication conditions.

3. The method of claim 1, wherein calculating the first power level includes:
   connecting a transmission detector to a receive path using a self-sensing circuit, wherein
      the receive path is configured to process the received wireless signal, and
      the transmission detector is initially configured to tune power levels in signals transmitted by the communication device; and
   calculating the amount of energy in a transmission jamming portion of the received wireless signal, wherein the transmission jamming portion represents interference caused by the contemporaneously transmitted transmission signal.

4. The method of claim 3, wherein selecting the low-power circuit includes switching to the low-power circuit when the amount of energy in the transmission jamming portion is below a jamming threshold.

5. The method of claim 4, wherein the low-power circuit is selected when the amount of energy in the transmission jamming portion is below the jamming threshold and regardless of the second power level.

6. The method of claim 1, wherein:
   calculating the second power level includes calculating a running average for the SNR for a set of recent communication frames; and
   selecting the low-power circuit includes selecting the low-power circuit based on comparing the second power level to a signal template representative of a signal with an acceptable SNR.

7. The method of claim 6, wherein selecting the low-power circuit includes:
calculating a difference between the second power level and the signal template; and
selecting the low-power circuit when the difference is below a predetermined threshold.

8. The method of claim 6, further comprising determining a modulation profile based on the received wireless signal, wherein:
the modulation profile represents a modulation scheme of the received wireless signal that controls a number of bits per each symbol in the received wireless signal, and
the low-power circuit is selected when the modulation profile corresponds to a rate below a predetermined rate threshold.

9. The method of claim 1, wherein:
the wireless signal includes a target data portion corresponding to a receiving frequency band;
the receiving frequency band, the first frequency region, and the second frequency region each include an exclusive continuous range of frequencies;
the first and second frequency region are separated by an intermediate band of separating frequencies;
at least one of the first and second frequency region are adjacent to and abutting the receiving frequency band; and
the low-power circuit is selected when the power in the target data portion exceeds power in adjacent and abutting frequency region by a threshold amount.

10. A non-transitory, computer-readable medium having processor instructions stored thereon that, when executed by one or more processors, cause the one or more processors to perform a method of claim 1.

11. A communications device comprising:
a power analysis circuit configured to
calculate in real-time (1) a first power level for a first frequency region in a received signal and (2) a second power level for a second frequency region, wherein the first and second frequency regions are separate from a receiving frequency band corresponding to a target data portion in the received signal;
generate a selection signal based on the first and power levels for controlling an amount of power used to process the received signal; and
a receive path coupled to the power analysis circuit, the receive path including a high-power circuit and a low-power circuit that are configured to process the received signal using different amounts of power, wherein the receive path is configured to select between the high-power circuit and the low-power circuit according to the selection signal,
wherein the method further comprising:
a transmission detector initially configured to tune power levels in signals transmitted by the communication device;
a self-sensing circuit connected between the transmission detector and the receive path, the self-sensing circuit configured to connect the receive path to the transmission detector for using the transmission detector to determine an amount of transmission interference in the received signal caused by a transmission signal transmitted by the communication device concurrent with receiving the received signal; and
wherein:
the power analysis circuit is configured to select the low-power circuit when the amount of transmission interference is below a jamming threshold.

12. The communications device of claim 11, wherein:
the receive path includes a mixer configured to demodulate the received signal to a baseband signal in processing the received signal; and
the self-sensing circuit is configured to tap out a frequency spectrum of the received signal before the mixer, wherein the frequency spectrum corresponds to the transmission signal.

13. The communications device of claim 11, wherein the self-sensing circuit includes a self-sensing switch configured to selectively disconnect the transmission detector from a transmission sensing circuit and connect to the receive path, wherein the self-sensing switch is operated according to a predetermined duration for determining the amount of transmission interference.

14. The communications device of claim 11, wherein the self-sensing circuit includes a self-sensing switch configured to selectively disconnect the transmission detector from a transmission sensing circuit and connect to the receive path when the communications device transmits the transmission signal.

15. The communications device of claim 11, wherein:
the power analysis circuit is configured to calculate a signal-to-noise ratio (SNR) that represents a comparison between the target data portion and the first and/or second power levels; and
the receive path is configured to select the low-power circuit when the SNR is above a noise threshold.

16. The communications device of claim 15, wherein:
the power analysis circuit is configured to determine a modulation profile associated with a data rate for the received signal; and
the receive path is configured to select the low-power circuit when the data rate is above a rate threshold.

17. The communications device of claim 15, wherein:
the power analysis circuit is configured to determine a modulation profile associated with a data rate for the received signal; and
the receive path is configured to select the low-power circuit when the modulation profile matches a predetermined modulation.

18. The communications device of claim 11, wherein:
the power analysis circuit is configured to calculate the first and/or the second power levels based on power in a frequency band within the received signal adjacent to a frequency band of the target data portion; and
the receive path is configured to select the low-power circuit when the power in the adjacent frequency band is below an interference power threshold.

* * * * *